United States Patent
Chin et al.

(10) Patent No.: US 8,898,618 B2
(45) Date of Patent: *Nov. 25, 2014

(54) INTERACTIVE SIMPLIFICATION OF SCHEMATIC DIAGRAM OF INTEGRATED CIRCUIT DESIGN

(75) Inventors: Choi Phaik Chin, Gelugor (MY); Denis Chuan Hu Goh, Gelugor (MY)

(73) Assignee: Altera Corporation, San Jose, CA (US)

( * ) Notice: Subject to any disclaimer, the term of this patent is extended or adjusted under 35 U.S.C. 154(b) by 952 days.

This patent is subject to a terminal disclaimer.

(21) Appl. No.: 12/412,045

(22) Filed: Mar. 26, 2009

(65) Prior Publication Data
US 2010/0251201 A1 Sep. 30, 2010

(51) Int. Cl.
*G06F 17/50* (2006.01)
*G06F 3/0482* (2013.01)

(52) U.S. Cl.
CPC .......... *G06F 17/5045* (2013.01); *G06F 3/0482* (2013.01); *G06F 2217/74* (2013.01)
USPC ........... 716/139; 716/101; 716/102; 716/103; 716/104; 716/106; 716/113; 716/118; 716/122; 716/132; 703/13; 703/14

(58) Field of Classification Search
CPC ............ G06F 17/5045; G06F 17/5054; G06F 2217/74
USPC ......... 716/100–104, 106, 113, 118, 132, 139; 703/13, 14
See application file for complete search history.

(56) References Cited

U.S. PATENT DOCUMENTS 5,574,655 A * 11/1996 Knapp et al. .................. 716/104
5,633,803 A * 5/1997 Silve et al. ..................... 716/102
5,880,971 A * 3/1999 Dangelo et al. ............... 716/105
5,883,807 A * 3/1999 Fanjoy .......................... 716/103

(Continued)

FOREIGN PATENT DOCUMENTS

CN          1719447 A       1/2006
CN        101063987 A      10/2007

OTHER PUBLICATIONS

U.S. Appl. No. 12/128,487, filed May 28, 2008, Chin et al.

(Continued)

*Primary Examiner* — Helen Rossoshek
(74) *Attorney, Agent, or Firm* — Mauriel Kapouytian Woods LLP; Ararat Kapouytian

(57) ABSTRACT

The interactive grouping tool offers the flexibility to simplify the schematic diagram of an integrated circuit (IC) design by grouping circuit elements that are not specified to be of interest into entities of any size. Circuit elements of various types and functionalities, including ports and pins, can be combined together into the same entity without modifying the underlying design logic and connectivity. By grouping and hiding the unnecessary details, the tool reduces clutter in a schematic diagram and greatly eases the process of traversing, debugging, and analyzing the schematic diagram. Users can choose to dynamically group the circuit elements on the schematic diagram without going through any compilation or synthesis process. Users can also choose to revert any of the entities back to the original schematic diagram with the ungrouping operation. For specific or batch manipulation of the schematic diagram, the tool provides a scripting interface for users to enter commands. The content of selected entities can be changed by using the drag-and-drop technique for certain operations including moving nodes into, removing nodes from, and adding nodes into an entity.

25 Claims, 17 Drawing Sheets

(56) References Cited

U.S. PATENT DOCUMENTS

| | | | |
|---|---|---|---|
| 5,937,190 A * | 8/1999 | Gregory et al. | 717/131 |
| 6,115,034 A * | 9/2000 | Tanaka et al. | 715/700 |
| 6,272,671 B1 * | 8/2001 | Fakhry | 716/103 |
| 6,295,627 B1 * | 9/2001 | Gowni et al. | 716/104 |
| 6,298,319 B1 * | 10/2001 | Heile et al. | 703/26 |
| 6,301,687 B1 | 10/2001 | Jain et al. | |
| 6,317,860 B1 * | 11/2001 | Heile | 716/102 |
| 6,401,230 B1 * | 6/2002 | Ahanessians et al. | 716/102 |
| 6,438,729 B1 * | 8/2002 | Ho | 716/113 |
| 6,490,717 B1 * | 12/2002 | Pedersen et al. | 716/104 |
| 6,574,787 B1 * | 6/2003 | Anderson | 716/103 |
| 6,763,506 B1 * | 7/2004 | Betz et al. | 716/108 |
| 6,799,307 B1 * | 9/2004 | Lipton et al. | 716/112 |
| 6,851,094 B1 * | 2/2005 | Robertson et al. | 716/129 |
| 6,877,140 B1 * | 4/2005 | Perry | 716/104 |
| 6,983,435 B2 * | 1/2006 | Baumgartner et al. | 716/106 |
| 6,988,253 B1 * | 1/2006 | Lipton et al. | 716/112 |
| 7,100,133 B1 * | 8/2006 | Meiyappan et al. | 716/102 |
| 7,231,337 B1 * | 6/2007 | Karchmer et al. | 703/15 |
| 7,240,302 B1 * | 7/2007 | Chang | 716/119 |
| 7,337,100 B1 * | 2/2008 | Hutton et al. | 703/13 |
| 7,418,683 B1 * | 8/2008 | Sonnard et al. | 716/122 |
| 7,418,690 B1 | 8/2008 | Van Antwerpen | |
| 7,441,225 B2 * | 10/2008 | Boutin et al. | 716/106 |
| 7,478,346 B2 * | 1/2009 | Hsu et al. | 716/104 |
| 7,526,741 B2 * | 4/2009 | Lee et al. | 716/106 |
| 7,562,328 B1 * | 7/2009 | Phaik | 716/103 |
| 7,571,405 B1 * | 8/2009 | Aik | 716/107 |
| 7,668,682 B2 * | 2/2010 | Gonzalez et al. | 702/117 |
| 7,689,955 B1 * | 3/2010 | van Antwerpen et al. | 716/113 |
| 7,725,853 B1 * | 5/2010 | Fung et al. | 716/113 |
| 7,823,092 B1 * | 10/2010 | Perry | 716/101 |
| 7,895,549 B1 * | 2/2011 | Perry | 716/100 |
| 7,904,870 B2 * | 3/2011 | Bell et al. | 716/132 |
| 7,913,194 B1 * | 3/2011 | Baylor | 716/122 |
| 7,941,774 B2 * | 5/2011 | Luan et al. | 716/113 |
| 7,949,983 B2 * | 5/2011 | Eshun et al. | 716/122 |
| 8,407,645 B1 * | 3/2013 | Caranci et al. | 716/126 |
| 8,418,093 B2 * | 4/2013 | Baumgartner et al. | 716/103 |
| 8,495,546 B1 * | 7/2013 | Chin et al. | 716/119 |
| 8,539,407 B2 * | 9/2013 | Dirks et al. | 716/108 |
| 2004/0030414 A1 * | 2/2004 | Koza et al. | 700/1 |
| 2005/0268258 A1 * | 12/2005 | Decker | 716/4 |
| 2005/0268269 A1 * | 12/2005 | Coiley | 716/11 |
| 2006/0190917 A1 * | 8/2006 | Edwards | 716/21 |
| 2007/0256037 A1 * | 11/2007 | Zavadsky et al. | 716/2 |
| 2009/0064080 A1 * | 3/2009 | Alpert et al. | 716/13 |
| 2010/0107130 A1 * | 4/2010 | Bowers et al. | 716/5 |

OTHER PUBLICATIONS

Notification of First Office Action, First Office Action, and Search Report in Chinese Patent Application No. 201010145108.1 dated Nov. 1, 2013.

Notification of Second Office Action, Second Office Action, and Search Report in Chinese Patent Application No. 201010145108.1 dated Jun. 4, 2014 (with English translation), 30 pages.

* cited by examiner

INTERACTIVE SIMPLIFICATION OF SCHEMATIC DIAGRAM OF INTEGRATED CIRCUIT DESIGN

BACKGROUND

This invention generally relates to designing integrated circuits (ICs) and more specifically to simplifying the schematic diagram of an IC design.

One of the processes in the design cycle of an IC involves defining the IC design at the register transfer level (RTL), where a designer determines the flow of signals between hardware registers and the logical operations performed on the signals. In an RTL design, the designer uses a hardware design language (HDL) to declare the registers and describe the combination logic by using constructs that are similar to those in standard programming languages such as if-then-else and arithmetic operations. Examples of HDL include Verilog and VHDL.

Electronic design automation (EDA) software is commonly used in designing ICs. By using EDA software during a process called synthesis in the design cycle of an IC, the HDL file can be converted to an equivalent netlist containing the generic hardware primitives to implement the logic specified in the HDL file.

Generally speaking, a netlist contains information concerning the number and types of elements in an IC design and the manner in which they are interconnected. In a netlist, the interconnected circuit elements, typically referred to as nodes, may be as simple as a resistor, or as complex as a microprocessor. The wires that connect the circuit elements are commonly referred to as nets. A typical netlist might include a list of circuit elements connected on a common net.

As market demand drives electronics companies to pack more performance and functionality into chips of ever-smaller geometries, the complexity of netlists has also increased tremendously, resulting in schematic diagrams that are invariably visually crowded and extremely difficult to manipulate when displayed for a user. Subsequently, synthesis problems require a greater amount of time to analyze and debug.

Netlist viewers typically provide a graphical user interface (GUI) to represent the schematic diagram of a netlist. With a netlist viewer, designers can check their designs visually to ensure that the connections and logic meet all requirements before simulation and other verification processes. Viewing a netlist represented in the form of a schematic diagram is a powerful way to analyze, debug, and optimize an IC design. For example, designers can move backwards and forwards in a schematic diagram and also move through levels of grouping hierarchy to find certain nodes or locate a specific net by visually inspecting the diagram.

The growing complexity of netlists necessitates the need for ways to render the schematic diagram in a less cluttered manner. A schematic diagram that hides the unnecessary implementation details without changing, the underlying logic eases the analysis, debugging, and optimization processes. Conventionally, a schematic diagram can be simplified in a number of ways, including:
a) Changing the original source (e.g., the HDL specification) and generating a new netlist to be displayed on the netlist viewer. This option is tedious and time-consuming because the HDL design requires recompilation every time the code is changed.
b) Editing the schematic diagram on the netlist viewer through the GUI.

Many EDA software tools provide netlist simplification features, which include at least one of the following:
a) Grouping and ungrouping of nodes. However, the nodes that can be grouped or ungrouped must already be defined as hierarchical instances in the HDL design. Thus, users cannot remove nodes from an existing group or add new and unrelated nodes into an existing group.
b) Filtering of nodes. With the filtering feature, users can filter out nodes and nets in a netlist to display only the logic and connections that are of interest. However, the filtering criteria are fixed by the program and users cannot bypass the fixed netlist modification program to modify the netlist directly based on their own criteria.
c) Grouping nodes into "clouds". A cloud comprises a group of combinational logic nodes. With the cloud-grouping feature, users can choose to hide the combinational logic in the schematic diagram by grouping them into clouds. The cloud-grouping feature is based on a fixed set of criteria defined in the software. Users can turn the cloud-grouping feature on or off; but do not have the flexibility to change the criteria for grouping the clouds. Furthermore, the cloud-grouping feature can be used on only combinational logic elements.
d) Partitioning nodes into multiple pages. The partitioning feature merely reduces the amount of detail per page, but does not hide the unnecessary details. Users still have to move from page to page while traversing through an unwieldy schematic diagram.

Examples of EDA software and netlist viewers include the following:
a) Active HDL from Aldec, Inc. of Henderson, Nev.;
b) Composer from Cadence Design Systems, Inc. of San Jose, Calif.;
c) Design Compiler Graphical from Synopsys, Inc. of Mountain View, Calif.;
d) DxDesigner from Mentor Graphics, Inc. of Wilsonville, Oreg.;
e) ISE from Xilinx, Inc. of San Jose, Calif.;
f) Leonardo Spectrum from Mentor Graphics, Inc. of Wilsonville, Oreg.;
g) Matrix from Altera, Inc. of San Jose, Calif.;
h) Quartus II from Altera, Inc. of San Jose, Calif.;
i) Synplify from Synopsys, Inc. of Mountain View, Calif.;
j) Undertow from Veritools, Inc. of Palo Alto, Calif.; and
k) ViewDraw from Aldec, Inc. of Henderson, Nev.

Generally speaking, many of the netlist viewers today provide a fixed set of criteria when it comes to reducing the number of nodes and nets on a schematic diagram and do not provide users the flexibility to simplify the schematic diagram based on their own requirements.

SUMMARY

Embodiments of the present invention, generally speaking, provide a viewing and editing tool in which users may employ a number of editing procedures to reduce the complexity and clutter on a schematic diagram of a netlist. Users may implement their own grouping and filtering criteria in hiding details that are not necessary, and displaying only the nodes and nets that they want to see. In one embodiment, the simplifications are performed after the synthesis stage and do not alter the underlying logic and specifications of the IC design.

The disclosed embodiments simplify the schematic diagram of an RTL netlist by grouping elements that are not of interest to users. The grouping process reduces clutter in the schematic diagram by showing only the elements that users want to see. Users also have the option to revert to the original schematic diagram by ungrouping the elements. The simplification operations are interactive, which means that the system waits for user input, processes the user input, and displays the results of simplification immediately on the schematic diagram after each user interaction without the need for compilation or synthesis. Any number of nodes and nets can be selected for grouping. Nodes are not restricted to the basic building blocks of a netlist such as ports, logic gates and registers, but also encompass more complex hardware constructs such as digital signal processors (DSPs) and/or microprocessors. The grouping of nodes is not restricted only to nodes of the same type. For example, a cluster of logic gates that form combination logic can be grouped together with registers. Nodes that perform different functions can also be combined together in the same group.

Embodiments of the present invention can be implemented in numerous ways, including as a method, a system, or a device. Several inventive embodiments of the invention are described below.

One embodiment of the invention relates to a method of simplifying a schematic diagram of an IC design. In the method, an IC design is represented as a schematic diagram and displayed on a GUI. In the schematic diagram, hardware primitives are represented as visual elements in different forms including shapes, symbols, and colors. The visual elements represent the nodes and nets interconnecting the nodes in the design. In the method, users are able to select from the nodes and nets in the design and group them into one or more entities. An entity is defined as a grouped collection of nodes and nets. From the user's perspective, an entity generally appears to be a single node where the underlying implementation details are not shown. Users are also able to ungroup an entity into its original elements or regroup a previously grouped set of elements back into an entity.

In another embodiment of the invention, an electronic device for generating and displaying a schematic diagram of a chip design is provided. The electronic device includes a memory and a screen for displaying the schematic diagram on a GUI. The electronic device also includes a processor for executing instructions related to generating the schematic diagram, receiving user input on simplifying the schematic diagram by grouping, ungrouping, or regrouping the circuit elements in the diagram.

Other aspects and advantages of the embodiments of the invention will become apparent from the following detailed description, taken in conjunction with the accompanying drawings.

BRIEF DESCRIPTION OF THE DRAWINGS

The novel features of the invention are set forth in the appended claims. However, for purpose of explanation, several aspects of particular embodiments of the invention are described by reference to the following figures.

DETAILED DESCRIPTION

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

The following embodiments describe how a schematic diagram can be simplified. In analyzing or debugging the design of an IC, most users are often interested in only certain sections of the design and not the whole schematic diagram. The grouping of nodes and nets reduces clutter in a schematic diagram and thereby greatly reduces the time needed to determine the relationship between nodes of interest.

In the described embodiments, nodes are used to denote all components of an IC design except for wires. Nets are used to denote wires directly or indirectly interconnecting the circuit elements. The term "node" encompasses a wide range of circuit elements from basic building blocks such as I/O pins, registers, and/or gates to complex logical constructs such as DSPs and/or microprocessors. In the embodiments herein, nodes are also used to refer to grouped nodes (entities), ports, and pins. An entity is a grouped collection of nodes and nets.

Figure 1:
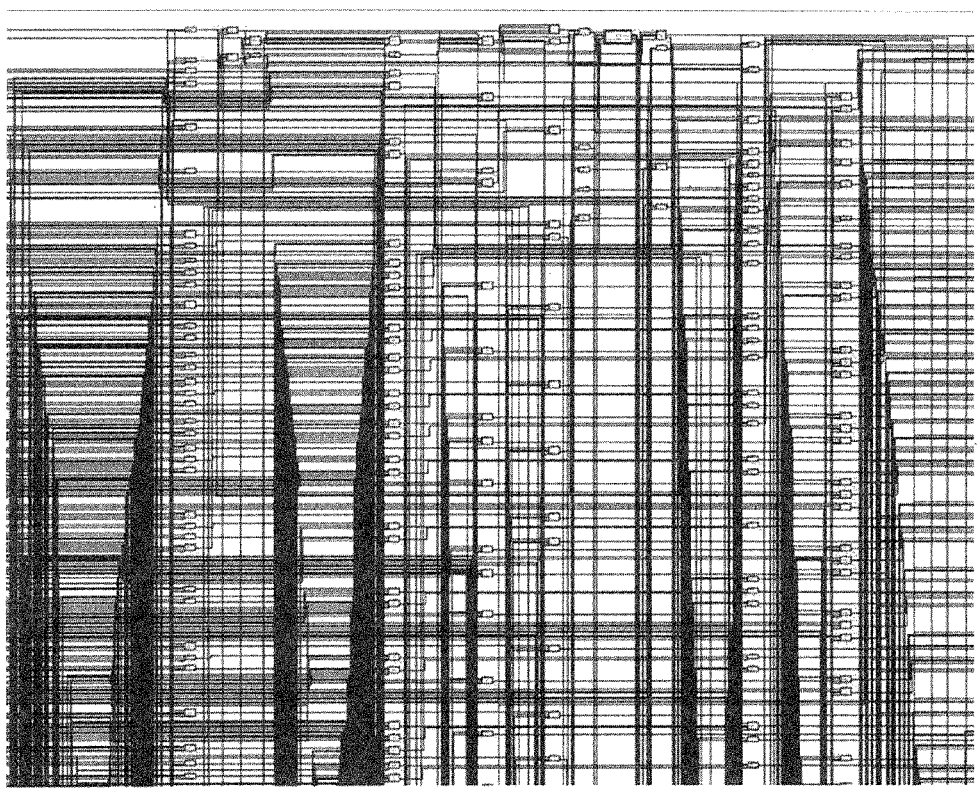
FIG. 1 illustrates an example schematic diagram representing a section of an IC.

FIG. 1 illustrates an example schematic diagram corresponding to a section of an IC. A schematic diagram can be generated by using a netlist viewer and displayed on a GUI for manipulation. From a user's perspective, the diagram m FIG.

1 appears almost completely dark because the number of circuit elements in the netlist is too large and the connections too complex to be easily differentiated by the naked eye.

Figure 2A:
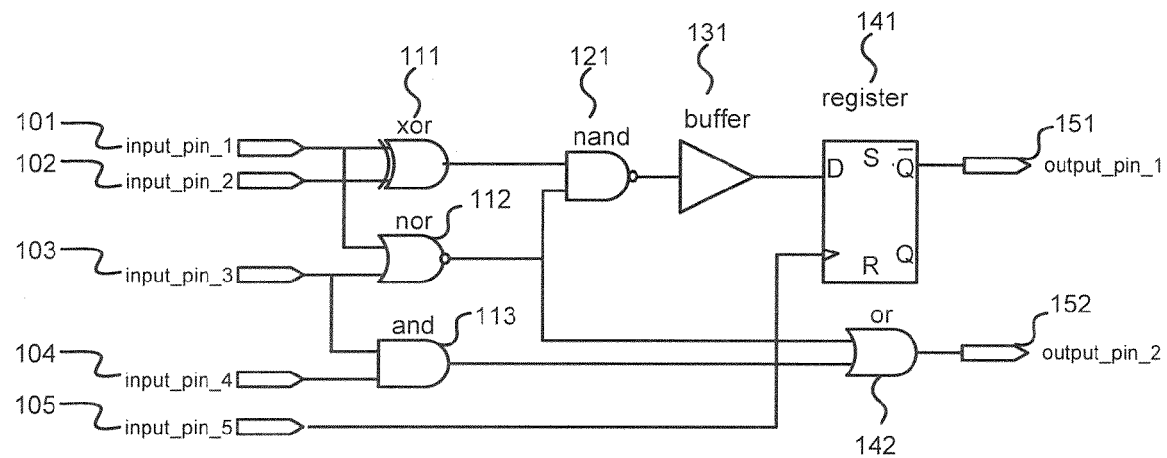
FIG. 2a illustrates a schematic diagram and FIG. 2b illustrates the resulting diagram after the diagram in FIG. 2a has been simplified using interactive grouping, according to one embodiment.
Figure 2B:
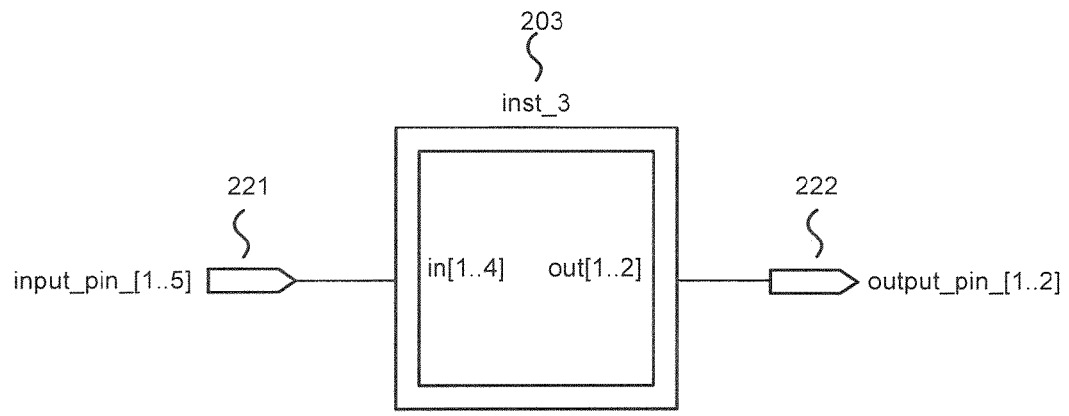

FIG. 2a illustrates a schematic diagram and FIG. 2b illustrates the resulting diagram after the diagram in FIG. 2a has been simplified using interactive grouping, according to one embodiment. The schematic diagram in FIG. 2a consists of input pins 101 to 105, a XOR node 111, a NOR node 112, an AND node 113, a NAND node 121, a BUFFER node 131, a register node 141, an OR node 142, and output pins 151 and 152. FIG. 2b shows the simplified schematic diagram consisting of only entity inst_3 203, one input pin group 221, and one output pin group 222 after interactive grouping has been performed. FIGS. 3a to 8b show the step-by-step grouping processes performed on the diagram in FIG. 2a to achieve the simplified diagram in FIG. 2b.

Figure 3A:
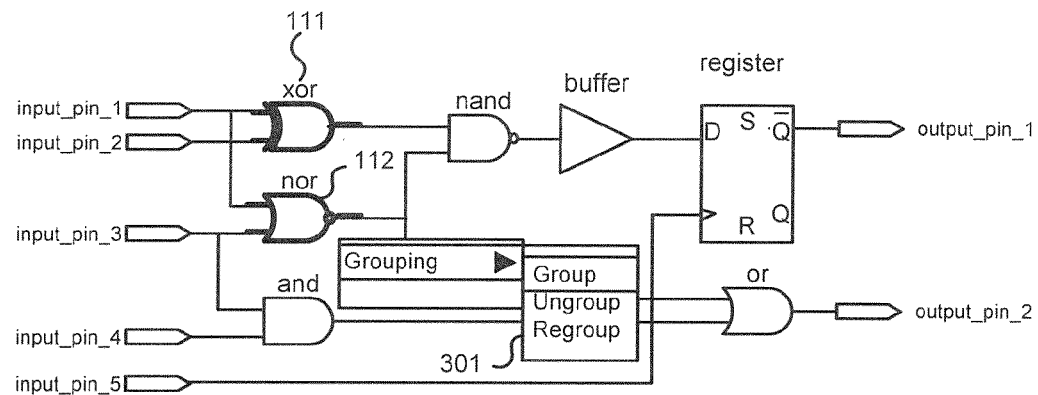
FIG. 3a illustrates a schematic diagram and FIG. 3b illustrates the resulting simplified diagram after the XOR and NOR nodes are grouped into entity inst_1, according to one embodiment.
Figure 3B:
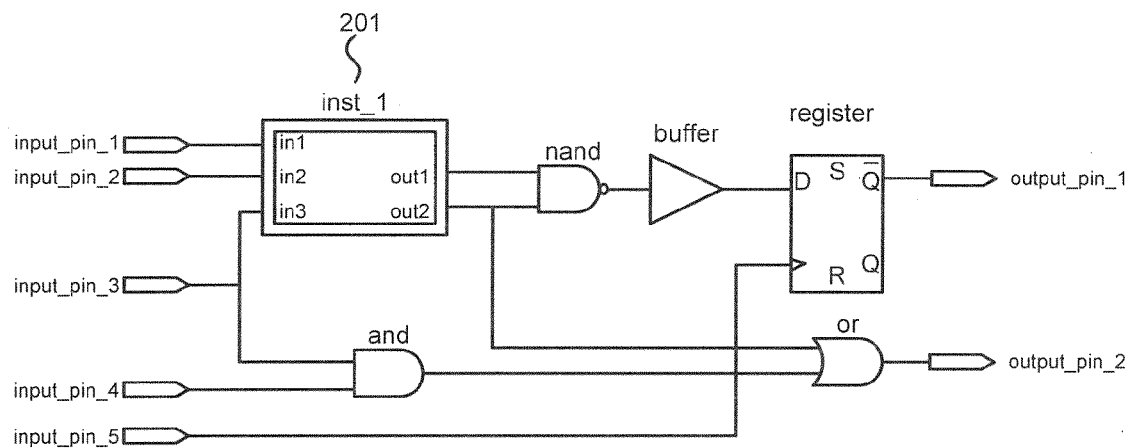

FIG. 3a illustrates a schematic diagram and FIG. 3b illustrates the resulting simplified diagram after the NOR and NOR nodes are grouped into entity inst_1, according to one embodiment. FIG. 3a shows both the XOR node 111 and NOR node 112 being selected for grouping. The GUI in the netlist viewer enables users to use a keyboard, touchpad, or a graphical input device (for example, a mouse) to select the nodes to group and a menu-driven interface similar to the one depicted in 301 for presenting the options available for manipulating the schematic diagram. Once selected, the graphical representations of nodes or nets are differentiated from those that are not selected. In this embodiment, the selected nodes are depicted using bold lines. This representation is shown by way of example, but other representations are possible using different icons, colors, patterns, etc., as long as the functionality described herein is maintained. In this embodiment, besides the grouping operation, users can also select the ungrouping or regrouping operation through the menu-driven interface of 301. FIG. 3b shows the resulting diagram where XOR node 111 and NOR node 112 have been grouped into inst_1 201.

Figure 4A:
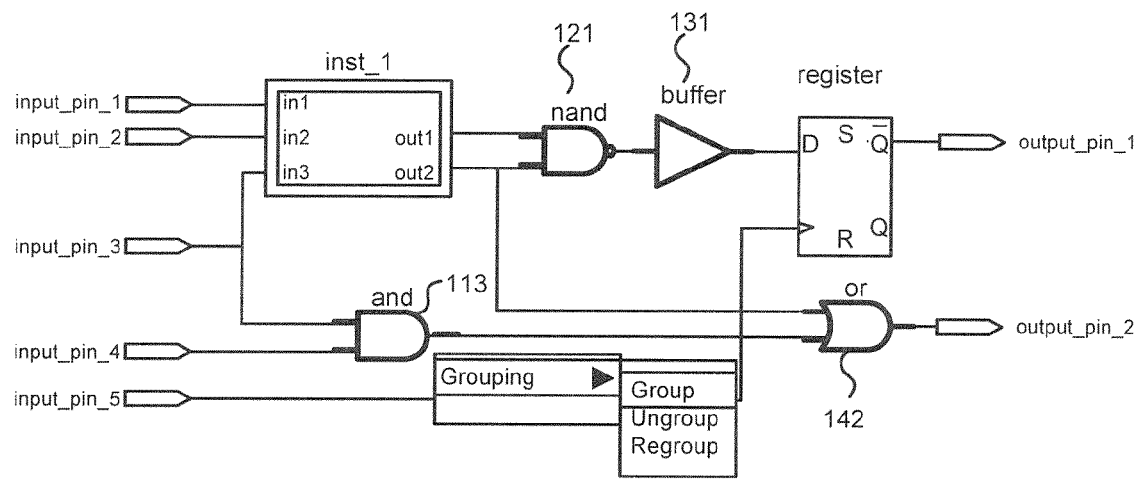
FIG. 4a illustrates a schematic diagram and FIG. 4b illustrates the resulting simplified diagram after the NAND, AND, BUFFER, and OR nodes are grouped into entity inst_2, according to one embodiment.
Figure 4B:
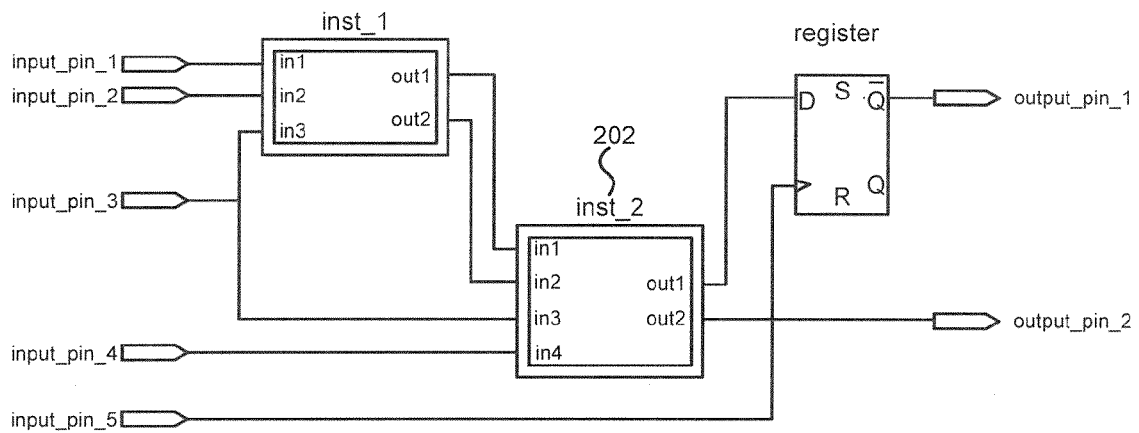

FIG. 4a illustrates a schematic diagram and FIG. 4b illustrates the resulting simplified diagram after the NAND, AND, BUFFER, and OR nodes are grouped into entity inst_2, according to one embodiment. In one embodiment, any number of nodes can be selected and grouped into an entity. In one embodiment, the selection of nodes can be independent of their function. In FIG. 4a, the AND node 113, NAND node 121, BUFFER node 131, and OR node 142 are nodes with different functions that are selected and grouped into entity_2 202, as shown in FIG. 4b.

Figure 5A:
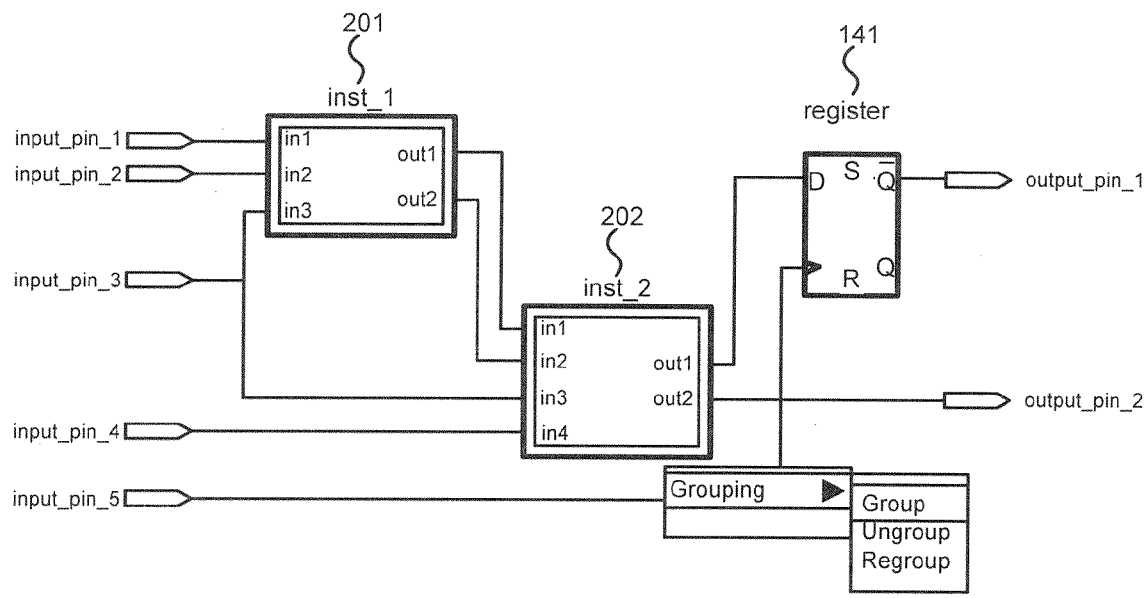
FIG. 5a illustrates a schematic diagram and FIG. 5b illustrates the resulting simplified diagram after the inst_1, inst_2, and register nodes are grouped into a new entity, inst_3, according to one embodiment.
Figure 5B:
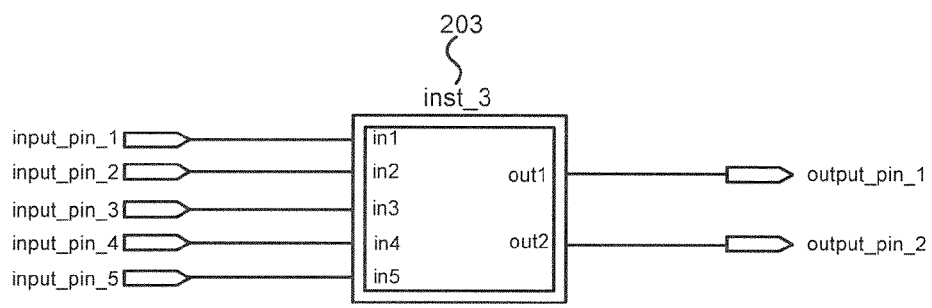

FIG. 5a illustrates a schematic diagram and FIG. 5b illustrates the resulting simplified diagram after the inst_1, inst_2, and register nodes are grouped into a new entity, inst_3 203, according to one embodiment. According to one embodiment, the interactive grouping can be performed not only on nodes of the same type, but also on nodes of different types. In other words, nodes can be selected for grouping into an entity independent of the type of the nodes. For example, combinational logic nodes (such as AND, OR, NOR, XOR, NAND, XNOR, BUFFER, or MUX node) can be combined with non-combinational logic nodes such as registers. More generally, as in the above example, in one embodiment, nodes can be selected for grouping into an entity independent of the type and function of the nodes. Grouped nodes or entities can be combined with other nodes or entities to be grouped again into different entities. In FIG. 5a, the inst_1 node 201, inst_2 node 202, and register node 141 are selected and grouped together into inst_3 node 203. The resulting diagram is shown in FIG. 5b.

Figure 6A:
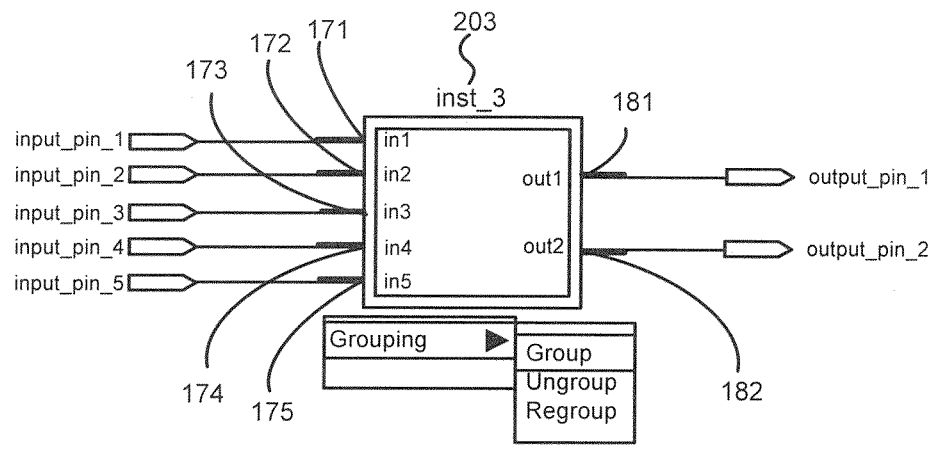
FIG. 6a illustrates a schematic diagram with entity inst_3 and FIG. 6b illustrates the resulting simplified diagram after the input ports of inst_3 are grouped into an input bus and the output ports of inst_3 are grouped into an output bus, according to one embodiment.
Figure 6B:
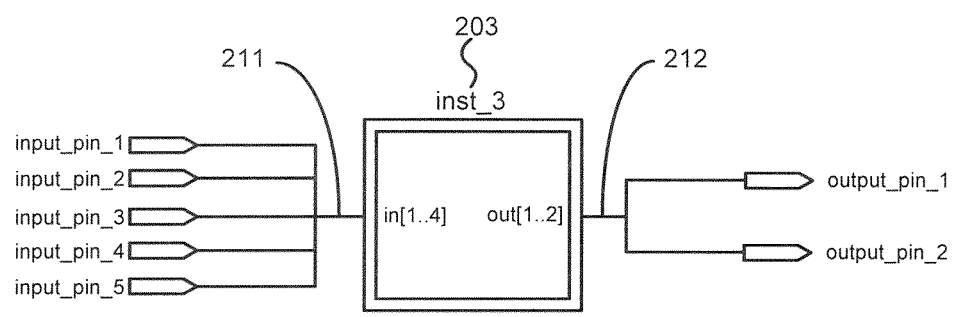

FIG. 6a illustrates a schematic diagram with entity inst_3 and FIG. 6b illustrates the resulting simplified diagram after the input ports of inst_3 are grouped into an input bus and the output ports of inst_3 are grouped into an output bus, according to one embodiment. In this embodiment, besides logic elements, the grouping process can also be used on I/O elements such as ports and pins in an IC. In one embodiment, for port grouping, users can only select ports that drive into or are being driven by the same node. Also in one embodiment, for a particular node, only ports of the same direction can be grouped, which means that input ports can only be grouped with other input ports, and output ports can only be grouped with other output ports. Different groups of ports can be selected and grouped simultaneously. FIG. 6a shows all the input ports 171 to 175 and output ports 181 to 182 of inst_3 node 203 being selected for grouping into different bus ports respectively. FIG. 6b shows the resulting diagram where the input ports have been grouped into bus port 211 and the output ports have been grouped into bus port 212.

Figure 7A:
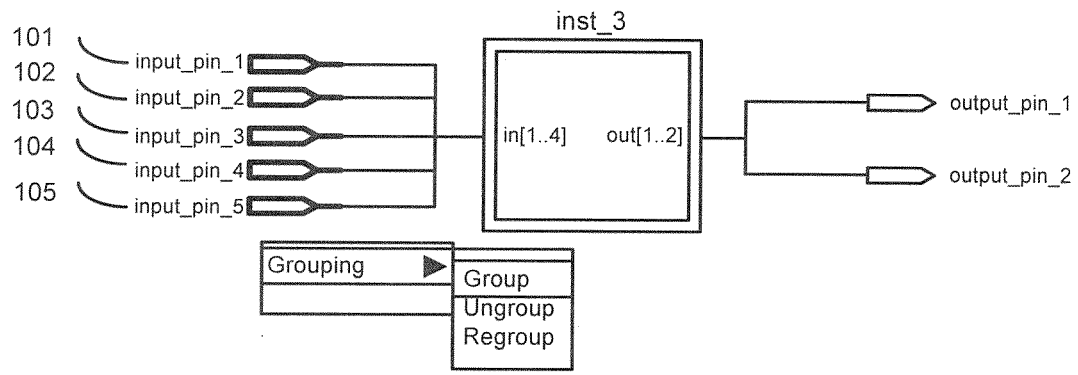
FIG. 7a illustrates a schematic diagram and FIG. 7b illustrates the resulting simplified diagram after the input pins are grouped together, according to one embodiment.
Figure 7B:
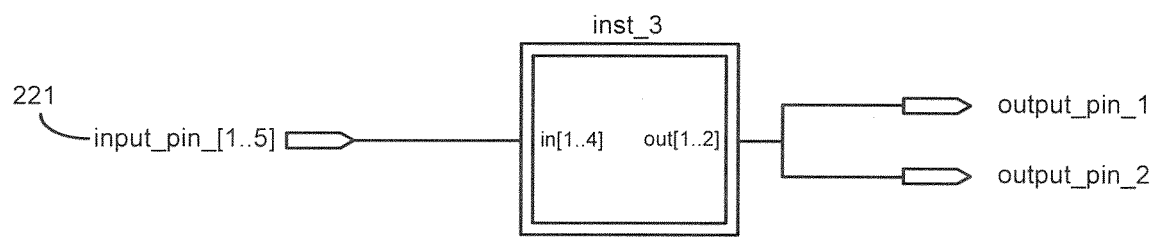

In one embodiment, users are also provided with the flexibility to group pins of the same direction. FIG. 7a illustrates a schematic diagram and FIG. 7b illustrates the resulting simplified diagram after the input pins are grouped together, according to one embodiment. In FIG. 7a, input pins 101, 102, 103, 104, and 105 are grouped into input pin group 221, as shown in FIG. 7b.

Figure 8A:
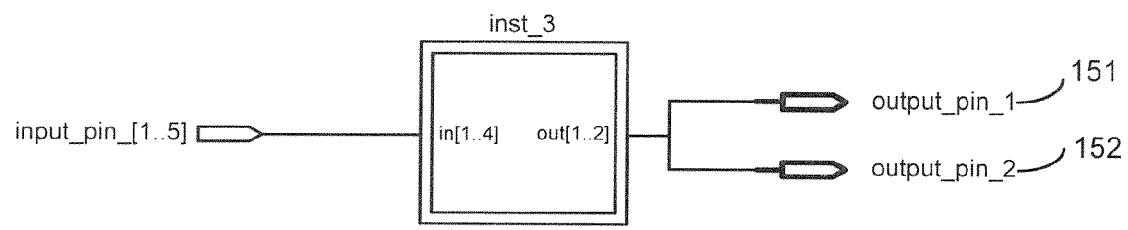
FIG. 8a illustrates a schematic diagram and FIG. 8b illustrates the resulting simplified diagram after the output pins are grouped together, according to one embodiment.
Figure 8B:
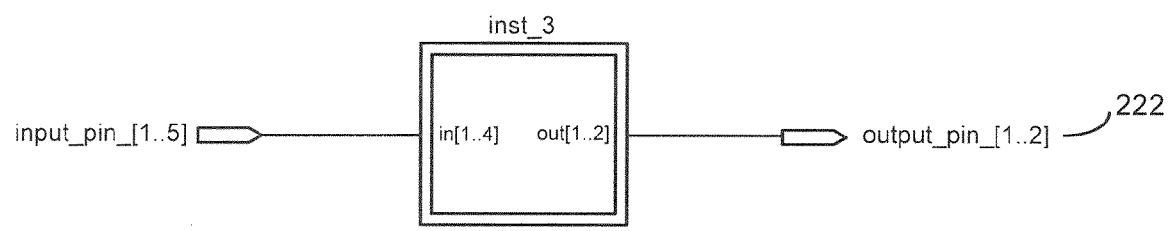

FIG. 8a illustrates a schematic diagram and FIG. 8b illustrates the resulting simplified diagram after the output pins are grouped together, according to one embodiment. In FIG. 8a, output pins 151 and 152 are grouped together into output pin group 222, as shown in FIG. 8b.

Figure 9:
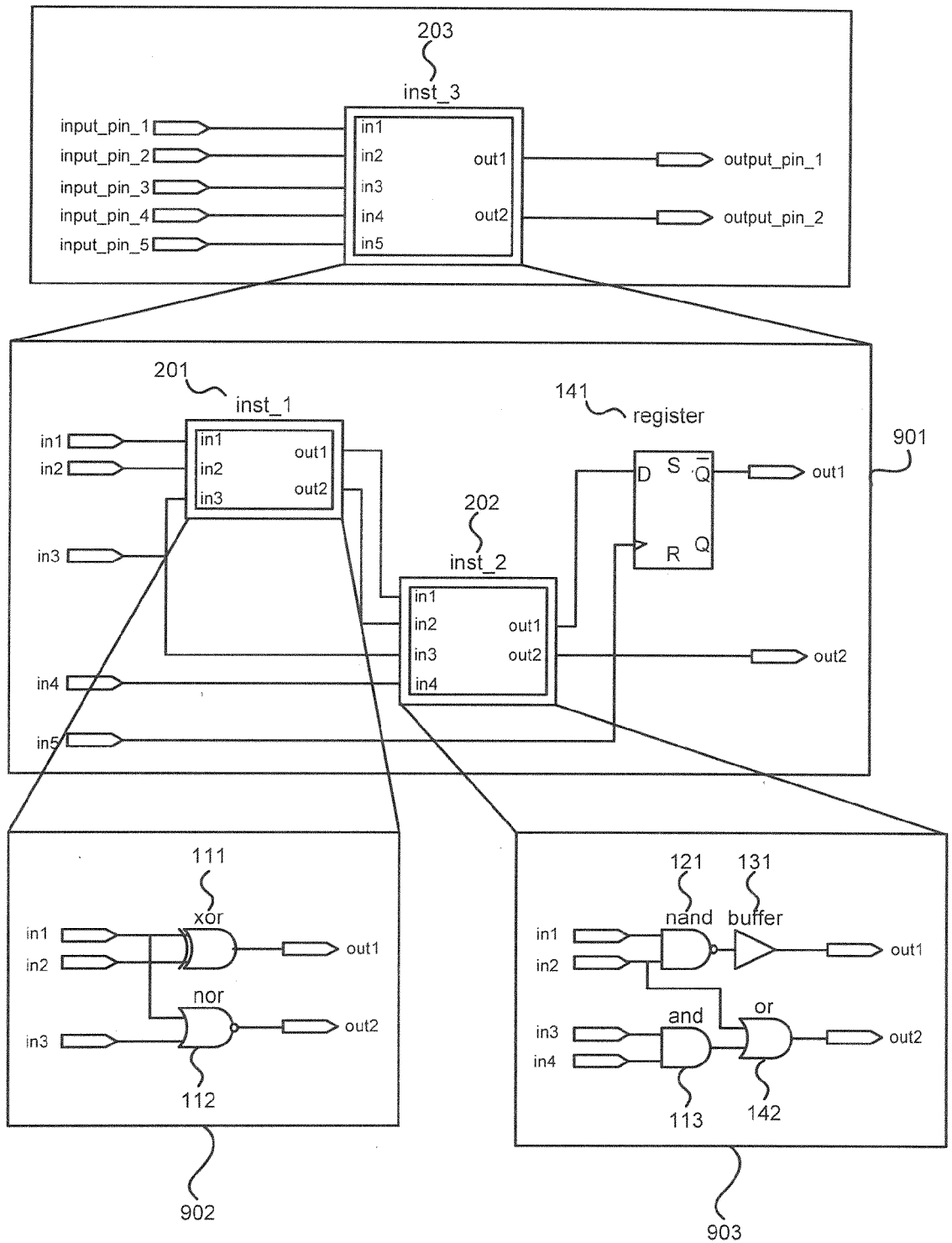
FIG. 9 illustrates entities that are expanded to show their underlying components, according to one embodiment.

FIG. 9 illustrates entities that are expanded to show their underlying components, according to one embodiment. This embodiment enables users to show the content of grouped entities without ungrouping the entity. Once grouped, each entity appears as a single node where the implementation details are hidden from users. However, each grouped entity can be expanded to reveal the components that have been placed inside, including other grouped entities. The option to expand the grouped entities can be made available through a menu-driven interface and selected with an input device such as a mouse. Each grouped entity can also be expanded using the mouse-over technique, i.e., by moving a mouse pointer above the grouped entity. The underlying components or entities are shown as long as the mouse pointer hovers above the grouped entity and kept out of view again when the mouse pointer moves away from the grouped entity. Other ways to view the underlying components may also be used such as by double-clicking on the grouped entity. In expanded view 901, the underlying components of entity inst_3 203 are shown as entity inst_1 201, entity inst_2 202, and register node 141. Entity inst_1 201 and entity inst_2 202 can be further expanded to show their respective underlying components. As shown in expanded view 902, entity inst_1 201 can be expanded to show its components including XOR node 111 and NOR node 112. Also, as shown in expanded view 903, entity inst_2 202 can be expanded to show its components including NAND node 121, AND node 113, BUFFER node 131, and OR node 142.

Figure 10A:
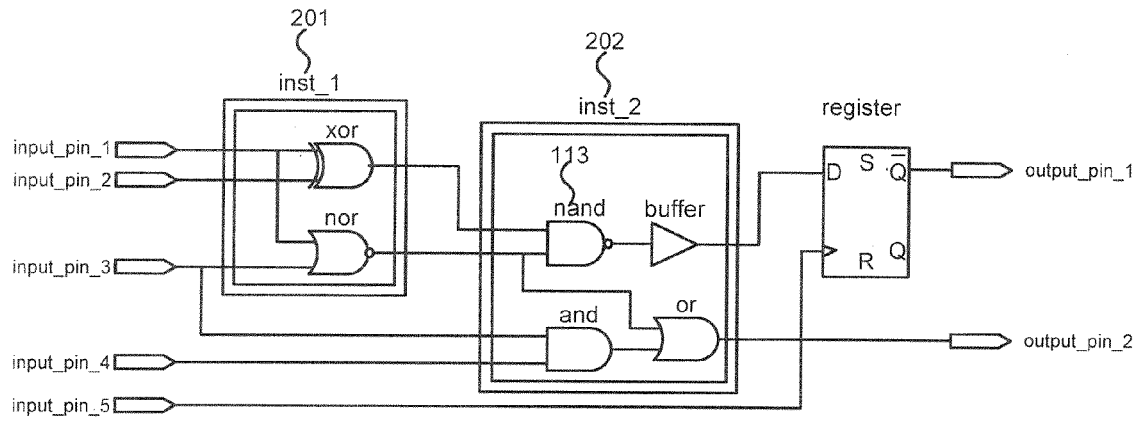
FIGS. 10a, 10b, and 10c illustrate the drag-and-drop operation, according to one embodiment.
Figure 10B:
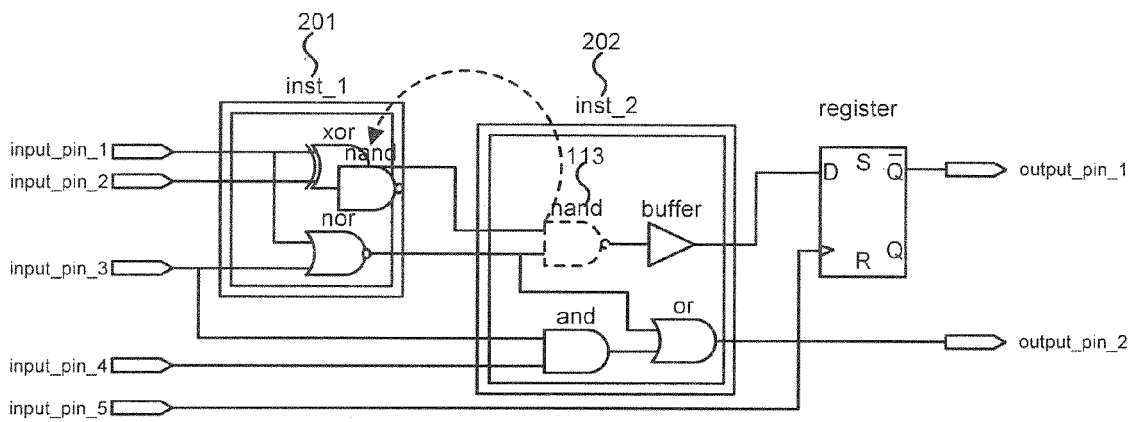
Figure 10C:
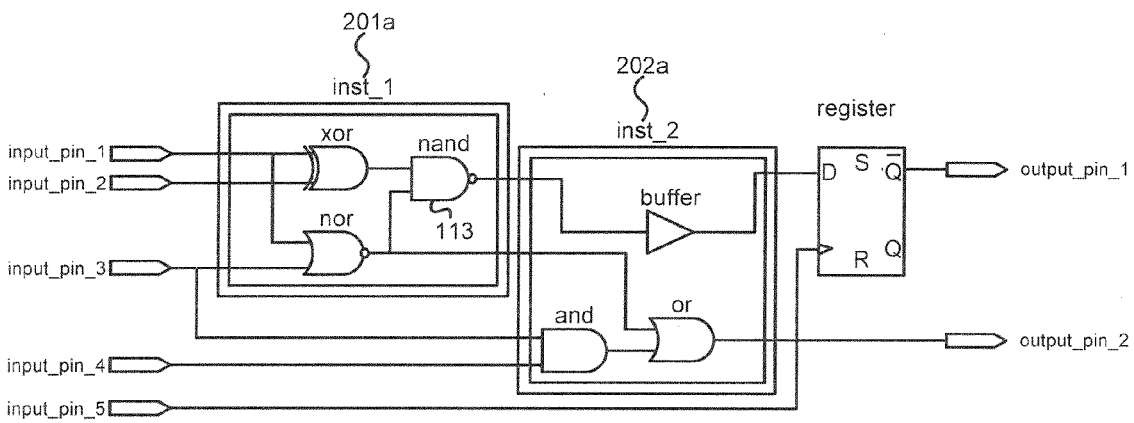

Another embodiment of the invention relates to the modification of the content of grouped entities using the drag-and-drop operation. FIGS. 10a, 10b, and 10c illustrate the drag-and-drop operation, according to one embodiment. Using the drag-and-drop technique, a node can be easily removed from or added to an entity. The composition of entities can be changed with the removal and addition of nodes. FIG. 10a shows a schematic diagram with two grouped entities, inst_1

201 and inst_2 202. FIG. 10b shows NAND node 113 being dragged over from entity inst_2 202 to entity inst_1 201. The resulting diagram with node NAND 113 having been moved to entity inst_1 201 is shown in FIG. 10c. After the move, entity inst_2 202a now has three nodes instead of four, whereas entity inst_1 201a now has three nodes instead of two. The placement of nodes and wire routing will be redrawn for the affected entities. The drag-and-drop operation is typically preformed through a user input device that allows users to select and move an object on the screen. Examples of such devices include a mouse, trackball, and keyboard.

Another embodiment of the invention relates to using scripting commands to issue grouping, ungrouping, and regrouping instructions to be preformed on the schematic diagram. These scripting commands can be entered via a user input device (such as a keyboard) at the command prompt of a display screen. A scripting environment or tool typically provides an interface for users to enter commands using a specific scripting language such as Tcl. Table 1 below shows some example commands that can be used to manipulate the display of a schematic diagram. One of the advantages of using script-based commands is the flexibility to specify a large number of nodes to be grouped or to perform more than one grouping simultaneously in a batch mode. It is also useful when users already know which nodes to select. Instead of traversing through the whole schematic diagram to search for the specific node, users can just list the node name in the scripting command. For example, the following command groups nodes specified through the –node parameter into an entity specified through the –grouped instance parameter:

group_instance–node<node_name>[–grouped_instance<instance_name>]

By using wildcard or regular expressions, users can widen the list and range of nodes to group.

TABLE 1

Commands for Interactive Simplification of a Schematic Diagram

| Command | Description |
| --- | --- |
| group_instance -node <node_name> [-grouped_instance <instance_name>] | This command groups all nodes specified by -node. The nodes are grouped into an entity named <instance_name>.<br>-node specifies a list of candidate nodes for grouping. Wildcard and regular expressions can be used to identify a number of nodes.<br>If -grouped_instance is not specified, the entity is assigned a default name. |
| ungroup_instance -instance <instance_name> | This command ungroups entities specified by -instance. Wildcard and regular expressions can be used to identify a number of instances and multiple entities can be ungrouped at the same time.<br>All nodes within the entity are highlighted after grouping. |
| group_port -instance <instance name> -port <port_name> [-grouped_port <grouped_port_name>] | This command groups ports. The grouping of ports is limited to grouping of ports within the same entity. The <instance_name> does not accept wildcard expressions.<br>All ports specified by <port_name> must be of the same type (either input or output ports).<br>The -port option specifies ports to be grouped into a bus port. Wildcard and regular expressions can be used to identify the ports to be grouped into a bus port.<br>The -grouped_port option allows the user to specify the name of the bus port. |
| ungroup_port -instance <instance_name> -bus_port <bus_port_name> | This command ungroups all bus ports specified by -port option.<br><bus_port_name> can be specified using wildcard and regular expressions, but <instance_name> must be specific. |
| remove_member -instance <instance_name> -node <node_name> | This command removes the nodes specified by <node_name> from the entity named <instance_name>.<br>The <node_name> can be specified with wildcard or regular expressions, but the <instance_name> must be specific.<br>The nodes specified by <node_name> is removed from the entity <instance_name> and placed at the same hierarchy level as the entity <instance_name>. |
| add_member -instance <instance_name> -node <node_name> | This command searches through all nodes at the same hierarchy level as the instance <instance_name> to find the nodes that satisfy <node_name> expression.<br>The <node_name> can be specified with wildcard or regular expressions, but the <instance_name> must be specific.<br>All nodes that satisfiy the <node_name> criteria are added to the instance <instance_name>. |

TABLE 1-continued

Commands for Interactive Simplification of a Schematic Diagram

| Command | Description |
| --- | --- |
| move_member -from_instance <src_instance_name> -to_instance <dest_instance_name> -node <node_name> | The function searches through all members of <src_instance_name>, and identify nodes that satisfy the <node_name> wildcard or regular expression. These nodes will be removed from <src_instance_name> and moved to <dest_instance_name>. The <src_instance_name> and <dest_instance_name> must be at the same hierarchy level. The <node_name> can be with wildcard or regular expressions, but the instance must be specific. |

Figure 11A:
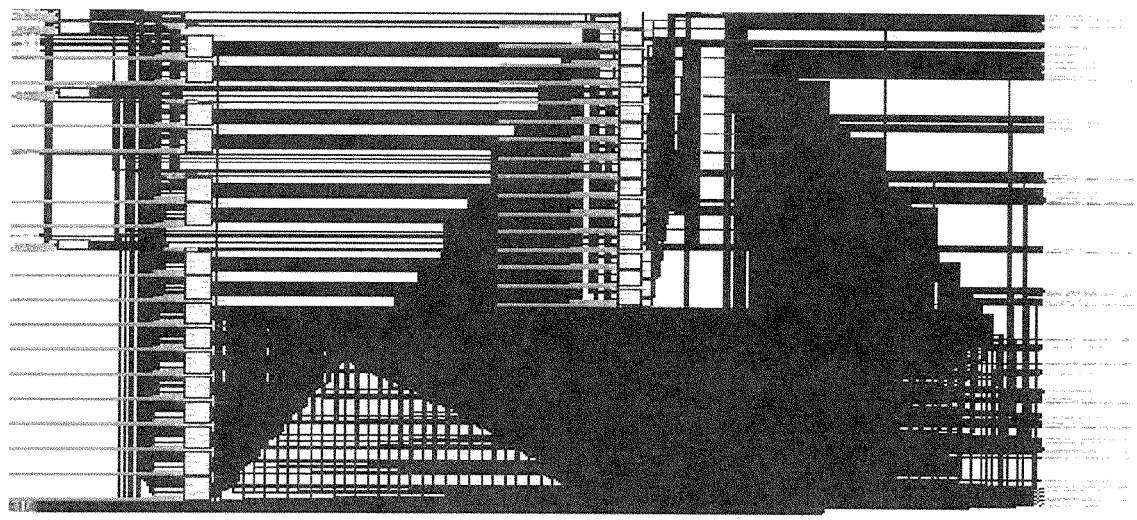
FIG. 11a shows a complicated and cluttered high-speed serial interface (HSSI) block that can be reduced to the three-block diagram of FIG. 11b by interactive simplification of the schematic diagram, according to one embodiment.
Figure 11B:
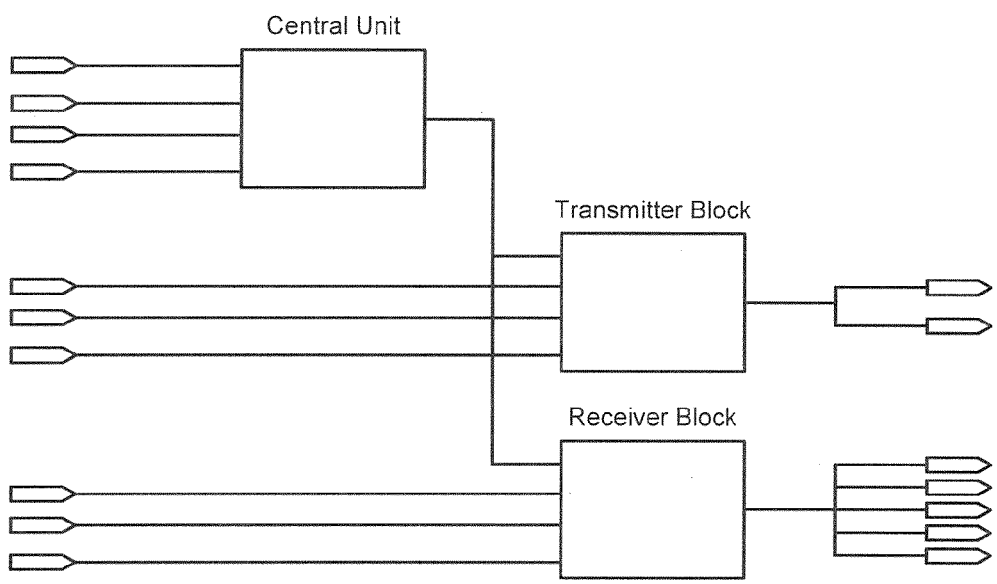

It is clear from the embodiments described herein that the invention provides a greater flexibility in enhancing the readability of schematic diagrams. Besides providing an intuitive GUI and several methods in which users can simplify schematic diagrams interactively, embodiments of the invention also do not limit the simplification criteria to those defined in the HDL or netlist viewer tool. Users can choose to group, regroup, and ungroup all nodes in the netlist into more manageable chunks, hiding details that are irrelevant. Nodes of different types and functionalities, including ports and pins, can be combined using the embodiments described herein including a menu-driven interface, scripting language, and the drag-and-drop technique. Often, when analyzing or debugging an IC design, users are only interested in a small section of the IC design. The interactive simplification tool enables users to show only the relevant sections of the IC design, thus shortening the time needed for traversing through the schematic diagram to trace a certain path or find a target node. For example, FIG. 11a shows a complicated and cluttered high-speed serial interface (HSSI) block that can be reduced to the three-block diagram of FIG. 11b by interactive simplification of the schematic diagram, according to one embodiment.

Figure 12A:
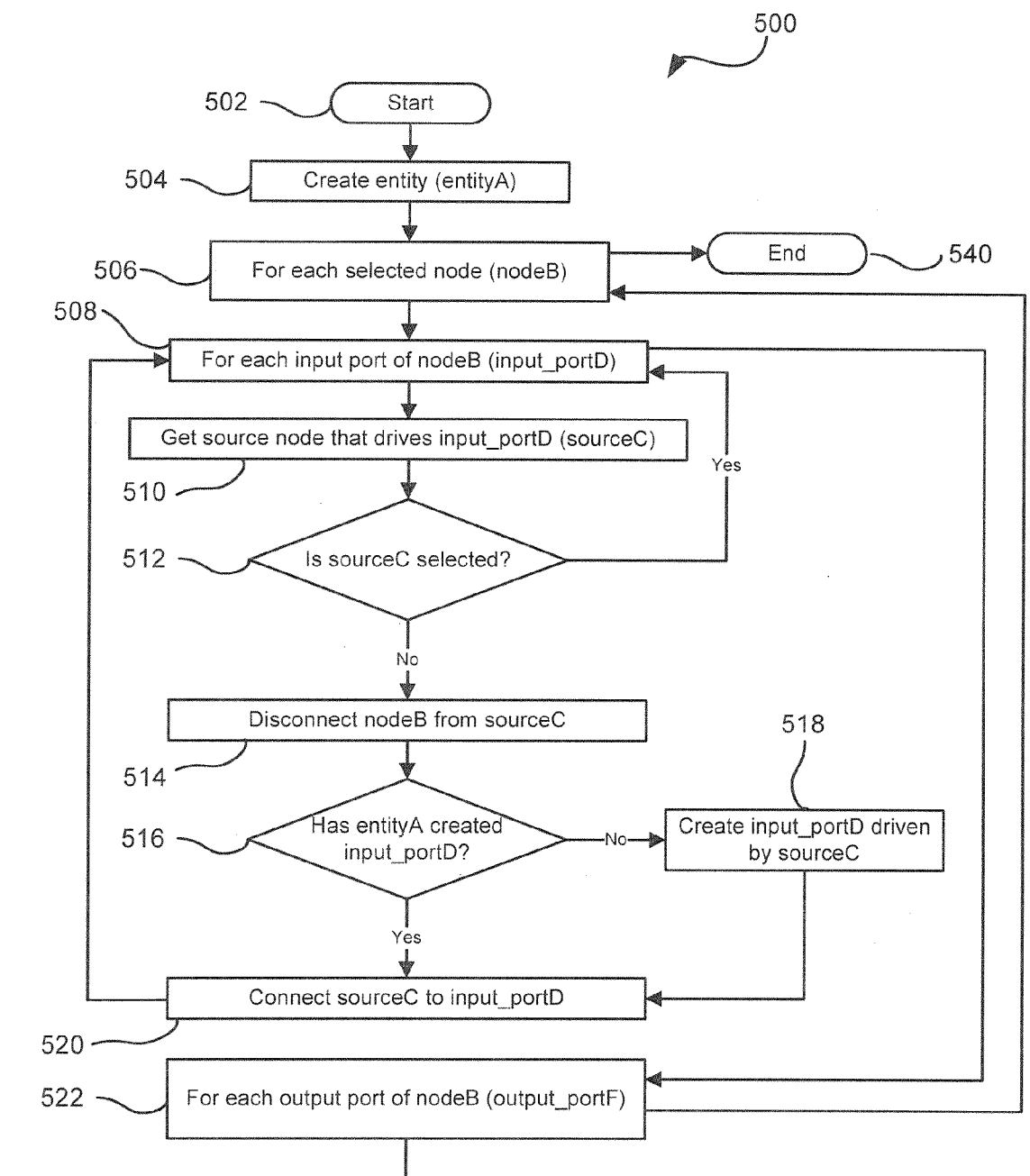
FIG. 12 illustrates the flow of the grouping process, according to one embodiment.
Figure 12B:
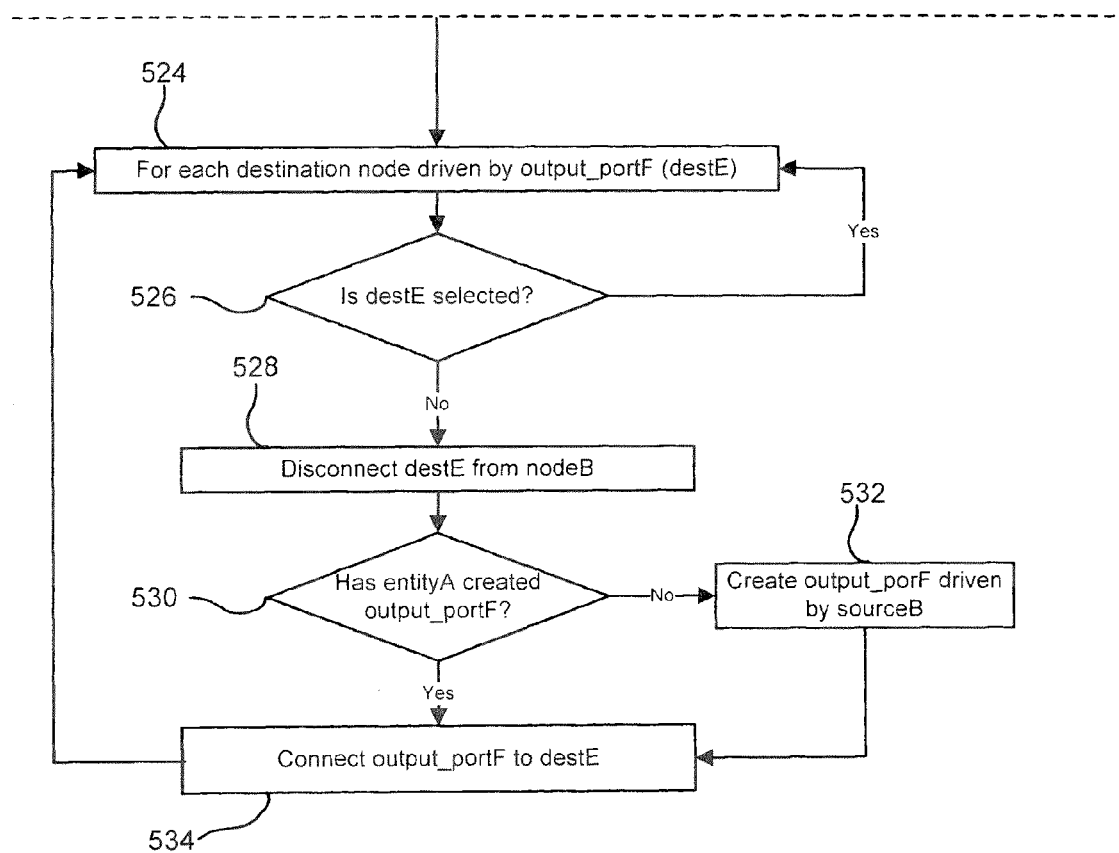

FIG. 12 illustrates the flow of the grouping process, according to one embodiment. The grouping process 500 starts with step 502, and goes to step 504, where a new entity (entityA) is created. The process then continues to step 506 where the system traverses through each node to see if it is selected. If the last node has been reached, the process ends, as seen in step 540. If the node (nodeB) under analysis is selected, the process continues to step 508, where the system checks and analyzes each input port (input_portD) of nodeB. Next, in step 510, the system gets the source node (sourceC) that drives input_portD. In step 512, if sourceC has been selected to be in the same group as nodeB, the system returns to step 506 to analyze the next node. If sourceC has not been selected to be in the same group as nodeB, the system continues to step 514 and disconnects sourceC from nodeB. In step 516, the system checks if entityA has created input_portD for connecting to sourceC. If not, a new input port is created in step 518 as the input port has been removed when nodeB was disconnected from sourceC. The system connects input_portD to sourceC in step 520.

After the input ports for each node has been analyzed, the system then moves to the analysis of output ports. The analysis begins in step 522 by checking for all the output ports (output_portF) of nodeB. In step 524, the system retrieves all destination nodes (destE) driven by output_portF. For each destE, the system checks if it is selected to be in the same group as nodeB in step 526. If so, the system moves back to step 524 to analyze the next node. If destE is not selected to be in the same group as nodeB, destE is disconnected from nodeB in step 528. After the disconnection, the output port that connects nodeB to destE is lost. Therefore, for the entity to establish a connection to destE, a new output port has to be created. In step 530, the system checks if entityA has created output_portF. If not, output_portF is created in step 532. If output_portF is present, the system then connects output_portF to destE in step 534.

The following pseudocode describes the flow of the grouping process, according to one embodiment. To the extent there are any inconsistencies between the pseudocode and process flow 500 of FIG. 12, process flow 500 and its associated description should be interpreted in a manner consistent with the method set forth in the pseudocode below.

```
create an entity (entityA)
for each selected node (nodeB)
    for each input port of nodeB (input_portD)
        get the source node which drives input port (sourceC)
        if sourceC is not selected for grouping
            disconnect nodeB from its sourceC
            if entityA has not created input_portD
                create input_portD that is driven by sourceC
            // end if entityA has no input_port driven by sourceC
            connect sourceC to input_portD
        // end if sourceC is not selected for grouping
    // for each input port of nodeB
    for each output port of nodeB (output_portF)
        for each destination node driven by output port (destE)
            if destE is not selected for grouping
                disconnect destE from nodeB
                if entityA has not created output_portF
                    create output_portF that is driven by nodeB
                // end if entityA has not created output_portF
                connect output_portF to destE
        // end for each destination node driven by output port (destE)
    //end for each output port of nodeB (output_portF)
    insert nodeB as a member of entityA
// end for each selected nodes (nodeB)
```

Figure 13:
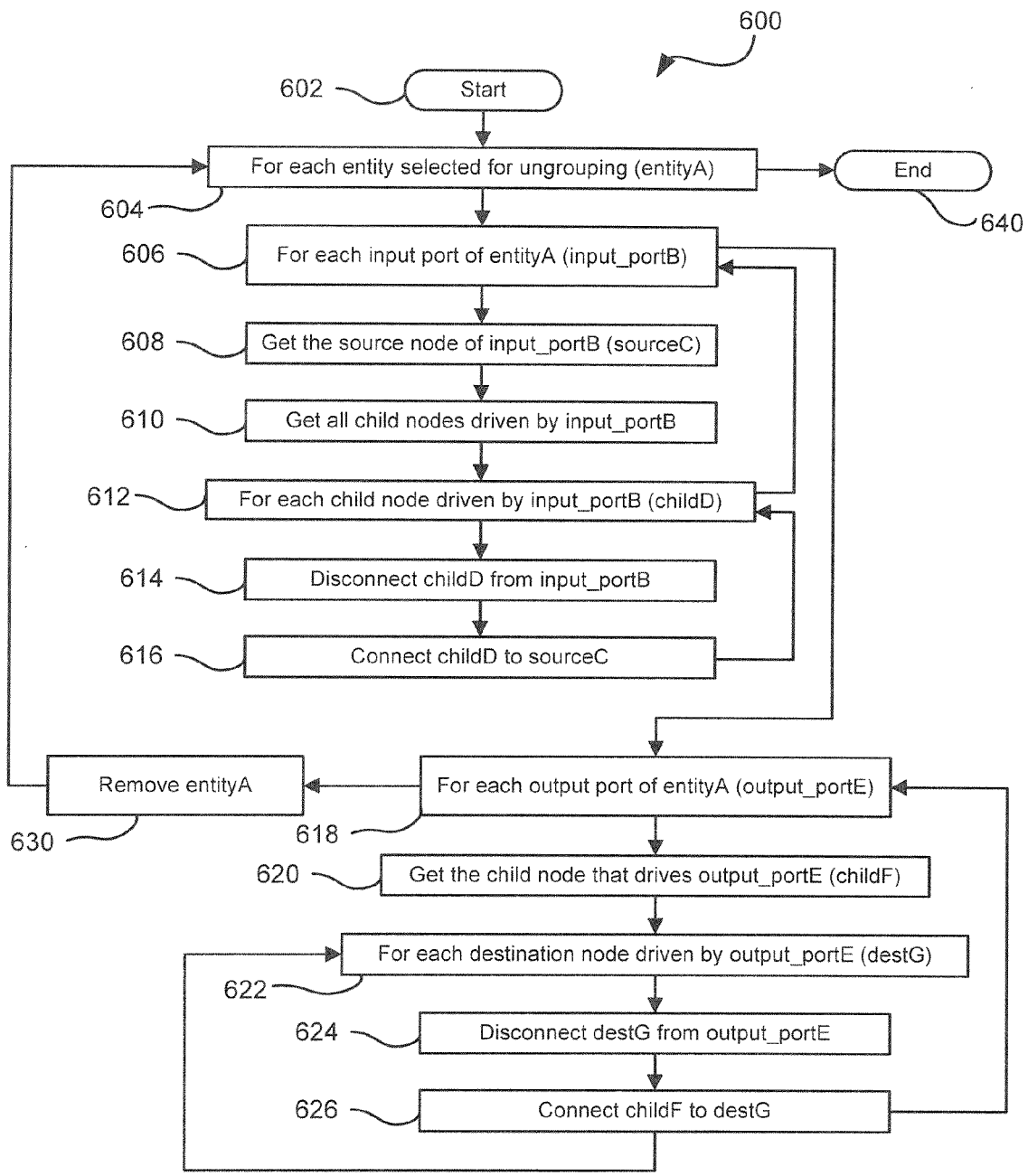
FIG. 13 illustrates the flow of the ungrouping process, according to one embodiment.

FIG. 13 illustrates the flow of the ungrouping process, according to one embodiment. The ungrouping process 600 starts with step 602 and continues to step 604, where the system analyzes each entity (entityA) selected for ungrouping. If the system cannot find any entity selected for ungrouping, the process ends at step 640. For each entity, the system checks for the input ports (input_portB) in step 606. For each input pot of the entity, the system retrieves the source node that drives input_portB (sourceC) in step 608 and retrieves all child nodes driven by input_portB in step 610. In step 612, the system analyzes each child node (childD) driven by input_portB. Each child is disconnected from input_portB in step 614 and subsequently connected to sourceC in step 616.

Once the system has traversed through all input ports of entityA, the system will then check for the output ports (output_portE) of entityA in step 618. Next, in step 620, the system retrieves the child node (childF) that drives output_portE. After retrieving the child node, the system retrieves the destination nodes (destG) that are driven by output_portE in step 622. Each destG is disconnected from output_portE in step 624 and connected back to childF in step 626. After all output ports for entityA have been analyzed, the system proceeds to step 630 where entityA is removed. Then the system returns to step 604 to ungroup the next entity.

The following pseudocode describes the flow of the ungrouping process, according to one embodiment. To the extent there are any inconsistencies between the pseudocode and process flow 600 of FIG. 13, process flow 600 and its associated description should be interpreted in a manner consistent with the method set forth in the pseudocode below.

```
for each entity selected for ungrouping (entityA)
    for each input port of entityA (input_portB)
        get the source node of input_portB (sourceC)
        get all child nodes driven by input_portB
        for each child node driven by input_portB (childD)
            disconnect childD from input_portB
            connect childD to sourceC
        // end for each child node driven by input_portB (childD)
    // end for each input port of entityA (input_portB)
    for each output port of entityA (output_portE)
        get the child node that drives output_portE (childF)
        for each destination node driven by output_portE (destG)
            disconnect destG from output_portE
            connect childF to destG
        // end for each destination node driven by output_portE (destG)
    remove entityA
// end for each of selected entity for ungrouping (entityA)
```

Figure 14A:
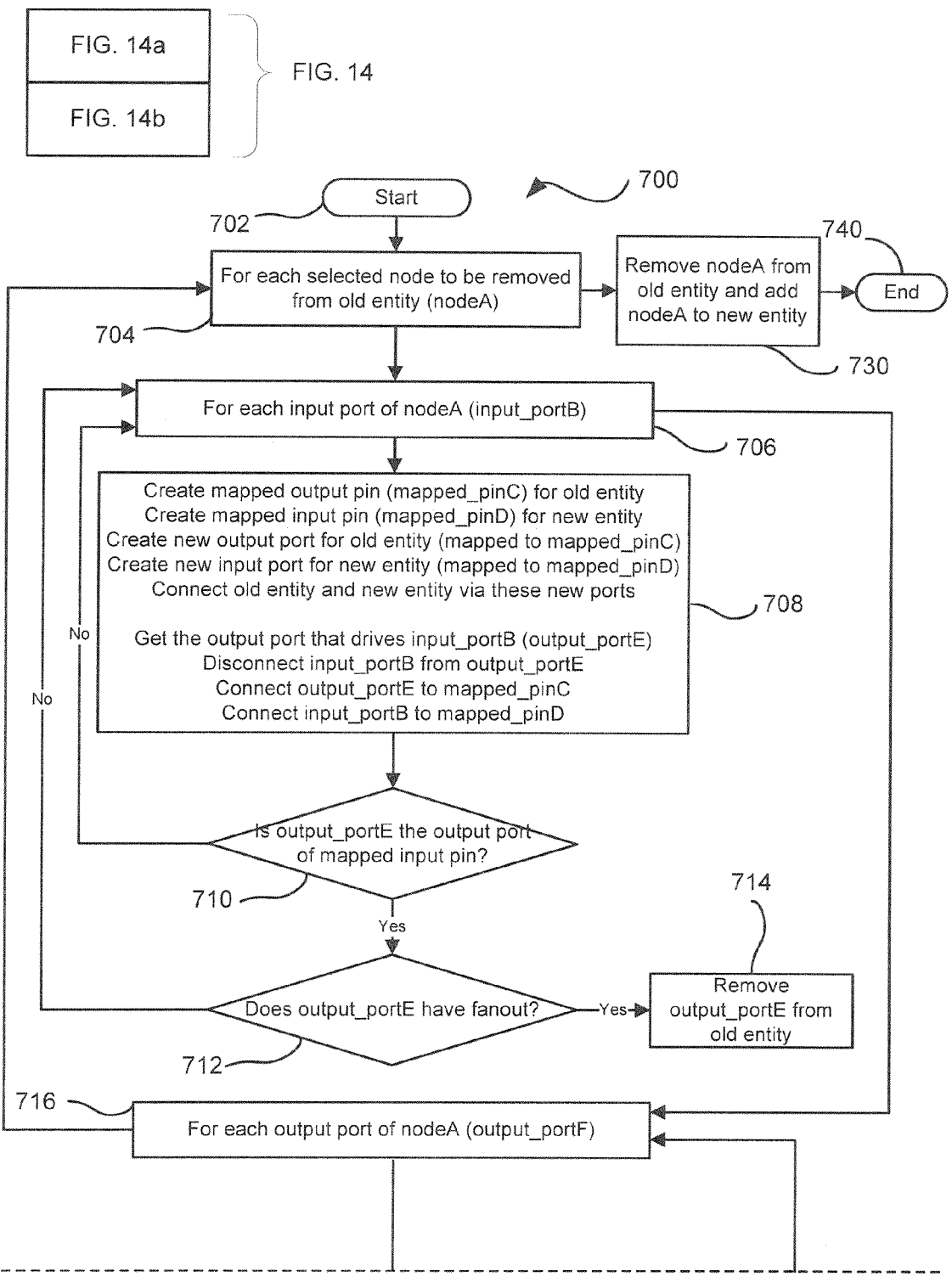
FIG. 14 illustrates the flow of the drag-and-drop operation, according to one embodiment.
Figure 14B:
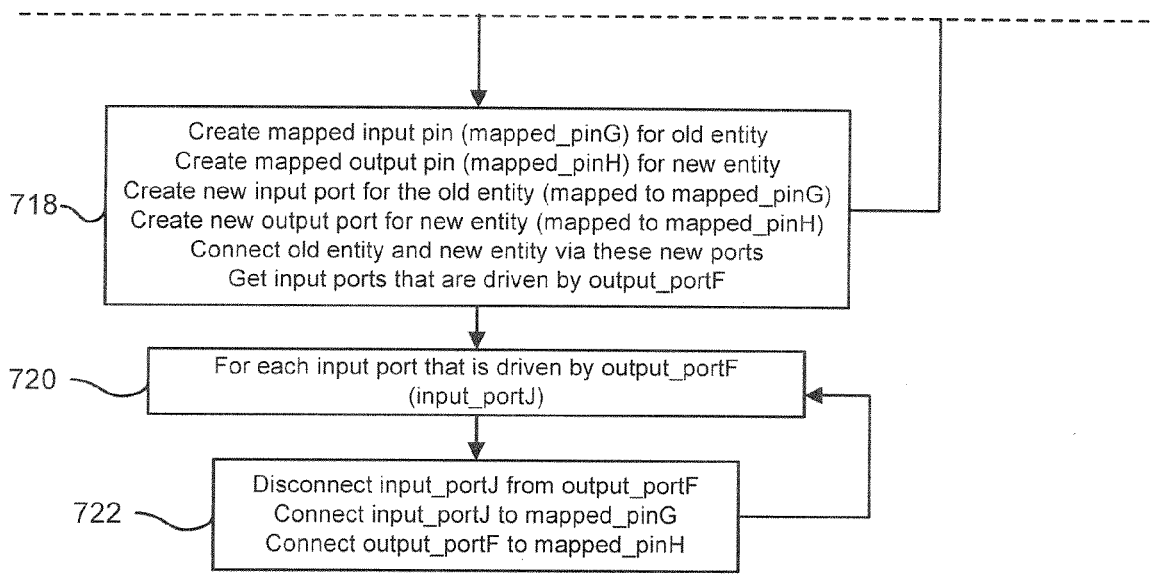

FIG. 14 illustrates the flow of the drag-and-drop operation, according to one embodiment. In the embodiment, at least one node is removed from an old entity and added to a new entity. The process starts at step 702 and proceeds to step 704 where each node (nodeA) that has been selected to be removed from an entity is analyzed. In step 706, the system checks for all the input ports (input_portB) of nodeA. For each input_portB, the system performs the following sub-steps in step 708:

a) Create a mapped output pin (mapped_pinC) for the old entity;
b) Create a mapped input pin (mapped_pinD) for the new entity;
c) Create a new output port for the old entity and map the new output port to mapped_pinC;
d) Create a new input port for the new entity and map the new input port to mapped_pinD;
e) Connect the old and new entities with the newly created input and output ports;
f) Get the output port that drives input_portB (output_portE);
g) Disconnect input_port B from output_portE;
h) Connect output_portE to mapped_pinC; and
i) Connect input_portB to mapped_pinD.

After step 708, the system then determines if output_portE is the output port of mapped_pinD in step 710. If it is not, the process returns to step 706 to analyze the next input port of nodeA. If it is, then the system determines if output_portE has any fan-out in step 712. If output_portE does not have any fan-out, then output_portE is removed from the old entity in step 714. If output_portE has fan-out, then the system returns to step 706.

After analyzing all input ports, the system analyzes the output ports (output_portF) of nodeA in step 716. For each output_portF, the system performs the following sub-steps in step 718:

a) Create a mapped input pin (mapped_pinG) for the old entity;
b) Create a mapped output pin (mapped_pinH) for the new entity;
c) Create a new input port for the old entity and map the new input port to mapped_pinG;
d) Create a new output port for the new entity and map the new output port to mapped_pinH;
e) Connect the old and new entities with the newly created input and output ports; and
f) Get the input ports that are driven by output_portF.

In step 720, the system proceeds to analyze each input port (input_portJ) that is driven by output_portF. In step 722, the system performs the following sub-steps for each input_portJ:

a) Disconnect input_portJ from output_portF;
b) Connect input_portJ to mapped_pinG; and
c) Connect output_portF to mapped_pinH.

After all the connections for each selected nodeA has been rewired, the system then removes nodeA from the old entity and adds nodeA to the new entity in step 730. The system repeats steps 706 to 730 for each selected node until all nodes have been traversed and the process ends at step 740.

The following pseudocode describes the flow of the drag-and-drop operation, according to one embodiment. To the extent there arc any inconsistencies between the pseudocode and process flow 700 of FIG. 14, process flow 700 and its associated description should be interpreted in a manner consistent with the method set forth in the pseudocode below.

```
for each selected node to be removed from old entity (nodeA)
    for each input port of nodeA (input_portB)
        create mapped output pin (mapped_pinC) for old entity
        create mapped input pin (mapped_pinD) for new entity
        create new output port for old entity (mapped to mapped_pinC)
        create new input port for new entity (mapped to mapped_pinD)
        connect old entity and new entity via these new ports
        get the output port that drives input_portB (output_portE)
        disconnect input_portB from output_portE
        connect output_portE to mapped_pinC
        connect input_portB to mapped_pinD
        if the output_portE is the output port of the mapped input pin and has
          no fanout
            remove output_portE from the entity
        // end if output_portE is the output port of the mapped input pin and
          has no fanout
    // end for each input port of nodeA (input_portB)
    for each output port of nodeA (output_portF)
        create mapped input pin (mapped_pinG) for old entity
        create mapped output pin (mapped_pinH) for new entity
        create new input port for old entity (mapped to mapped_pinG)
        create new output port for new entity (mapped to mapped_pinH)
        connect old entity and new entity via these new ports
        get the input ports that are driven by output_portF
        for each input port that is driven by output_portF (input_portJ)
            disconnect input_portJ from output_portF
            connect input_portJ to mapped_pinG
            connect output_portF to mapped_pinH
        // for each input port that is driven by output_portG (input_portJ)
    // end for each output port of nodeA (output_portG)
    remove nodeA from its entity
    add nodeA to its new entity
// end for each of selected entity for ungrouping (entityA)
```

Any of the operations described herein that form part of the embodiments of the invention are useful machine operations. Embodiments of the invention also relate to a device or an apparatus for performing these operations. The apparatus may be specifically constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can then be read by a computer system. Examples of computer readable medium include hard drives, network attached storage (NAS), read-only memory (ROM), random-access memory (RAM), compact disk read-only memory (CD-ROMs), compact disks recordable (CD-Rs), compact disks rewritable (CD-RWs), digital versatile disk (DVDs), flash memories or other non-volatile data storage devices, magnetic tapes, and other optical and non-optical data storage devices. The computer readable medium can also be distributed over a network coupled computer system so that the computer readable code is stored and/or executed in a distribution fashion.

Figure 15:
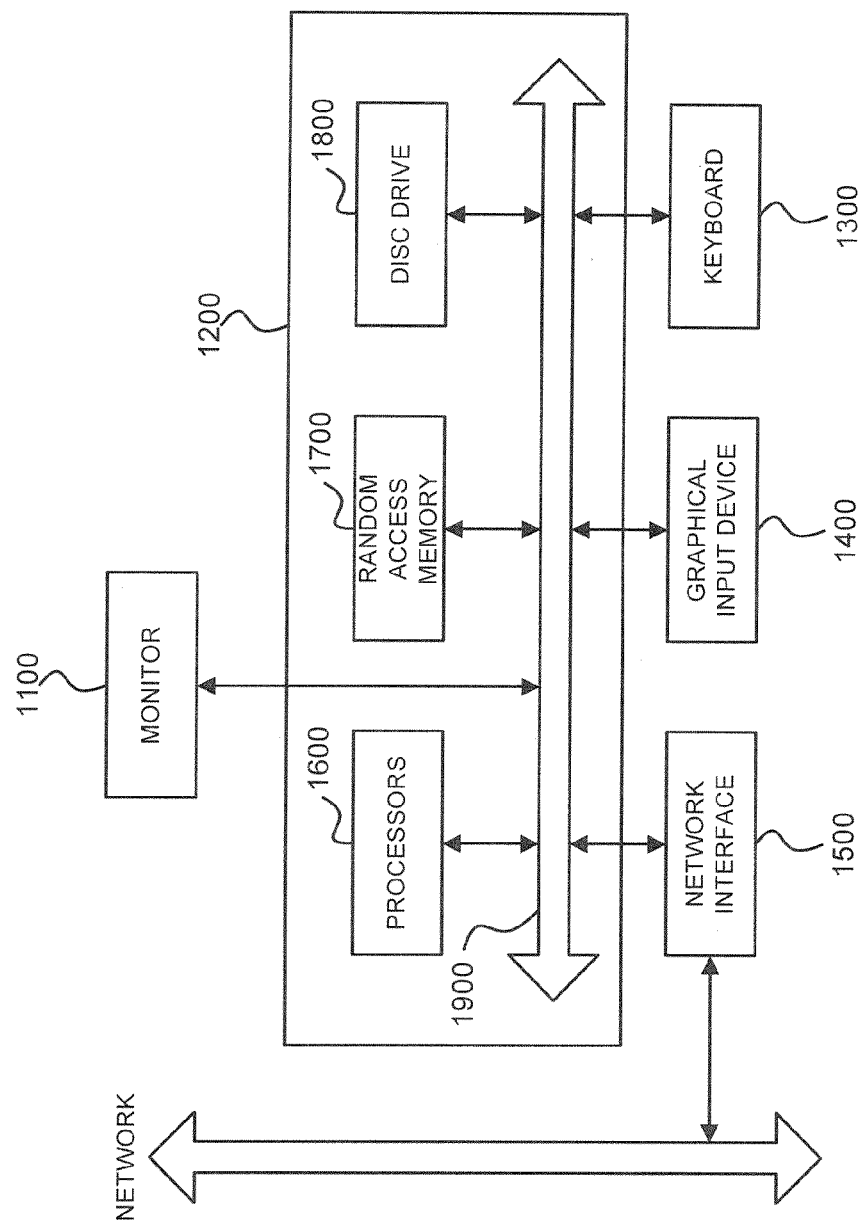
FIG. 15 illustrates a computer system, according to one embodiment.

FIG. 15 illustrates a computer system, according to one embodiment. Computer system 1000 typically includes a monitor 1100, computer 1200, a keyboard 1300, a graphical input device 1400, and a network interface 1500. The graphical input device 1400 includes a computer mouse, a trackball, a track pad, graphics tablet, touch screen, and/or other wired or wireless input devices that allow users to create or select graphics, objects, icons, and/or text appearing on the monitor 1100. Embodiments of network interface 1500 typically provides wired or wireless communication with an electronic communications network, such as a local area network, a wide area network (for example, the Internet) and/or virtual networks (for example a virtual private network (VPN)).

Computer 1200 typically includes components such as one or more general-purpose processors 1600, and memory storage devices such as RAM 1700, disk drives 1800, and system bus 1900 interconnecting the above components. RAM 1700 and disk drive 1800 are examples of tangible media for storage of data, audio/video files, computer programs, applet interpreter or compiler, virtual machines, and embodiments of the herein described invention. Further embodiments of computer 1200 can include specialized input, output, and communications subsystems for configuring, operating, testing, and communicating with programmable devices. Other types of tangible media include floppy disks, removable hard disks, optical storage media (such as digital versatile disks read-only memory (DVD-ROMs), CD-ROMs, and barcodes), non-volatile memory devices (such as flash memories, ROMs, and battery-backed volatile memories), and networked storage devices.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A method of simplifying a schematic diagram of an integrated circuit (IC) design, the method comprising:
   generating a schematic diagram of the IC design;
   displaying the schematic diagram on a graphical user interface (GUI), the schematic diagram having a first plurality of nodes and a first plurality of nets interconnecting the first plurality of nodes, wherein a node of the first plurality of nodes comprises a functional element of the IC design; and
   enabling a user to select from the first plurality of nodes and the first plurality of nets on the GUI and group selected nodes and nets into an entity, wherein nodes can be selected and grouped into the entity independent of their type, wherein the selected nodes include combinational logic nodes and non-combinational logic nodes, further wherein the entity is displayed, on the schematic diagram, instead of the selected nodes and nets.

2. The method of claim 1 further comprising simplifying the schematic diagram after a synthesis phase in a design process of an IC.

3. The method of claim 1 further comprising modifying the schematic diagram while retaining underlying logic of the IC design.

4. The method of claim 1, wherein the schematic diagram further includes at least one entity, wherein the at least one entity is a grouping of a second plurality of nodes and a second plurality of nets interconnecting the second plurality of nodes.

5. The method of claim 1, wherein the enabling comprises:
   for each node in the first plurality of nodes, assessing whether the node is a selected node;
   determining at least one input port for the selected node;
   for each input port in the at least one input port of the selected node, determining a source node that drives the input port;
   determining if the source node is designated to be in the same entity as the selected node; and
   if the source node is not designated to be in the same entity, disconnecting the source node from the entity.

6. The method of claim 5, wherein the disconnecting the source node from the entity comprises:
   if an input port has not been created for the entity, creating the input port that is driven by the source node; and
   connecting the source node to the input port.

7. The method of claim 5 further comprising:
   determining at least one output port for the selected node;
   for each output port of the selected node, determining a destination node that is driven by the output port;
   determining if the destination node is designated to be in the same entity as the selected node;
   if the destination node is not designated to be in the same entity, disconnecting the destination node from the selected node; and
   inserting the selected node as a member of the entity.

8. The method of claim 7, wherein the disconnecting the destination node from the entity comprises:
   if an output port has not been created for the entity, creating the output port that is driven by the selected node; and
   connecting the destination node to the output port.

9. The method of claim 1 further comprising enabling the user to select at least one entity on the GUI and ungroup the at least one entity into a third plurality of nodes and a third plurality of nets.

10. The method of claim 9 further comprising enabling the user to regroup the third plurality of nodes and the third plurality of nets into a previous entity.

11. The method of claim 9 further comprising:
determining at least one input port for each entity;
for each input port of the entity, determining a source node that drives the input port;
determining at least one child node that is driven by the input port;
for each child node that is driven by the input port, disconnecting the child node from the input port; and
connecting the child node to the source node.

12. The method of claim 11 further comprising:
determining at least one output port for each entity;
for each output port of the entity, determining a child node that drives the output port;
for each output port of the entity, determining at least one destination node that is driven by the output port;
disconnecting the destination node from the output port;
connecting the child node to the destination node; and
removing the entity.

13. The method of claim 1 further comprising enabling the user to select an entity and showing a fourth plurality of nodes and a fourth plurality of nets that have been placed in the entity.

14. The method of claim 1 further comprising:
enabling the user to move at least one node from a source entity to a destination entity; and
enabling the user to use a drag-and-drop technique for the move, wherein the user drags the at least one node from the source entity and drops the at least one node into the destination entity.

15. The method of claim 14 further comprising:
determining the at least one node to be removed from the source entity;
for each node of the at least one node to be removed, determining at least one input port of the node;
for each node of the at least one node to be removed, determining at least one output port of the node;
removing the node from the source entity; and
adding the node to the destination entity.

16. The method of claim 15, wherein the determining at least one input port of the node comprises:
for each input port of the at least one input port of the node, performing a series of steps including:
creating a mapped output pin for an old entity;
creating a mapped input pin for a new entity;
creating a new output port for the old entity, wherein the new output port is mapped to the mapped output pin for the old entity;
creating a new input port for the new entity, wherein the new input port is mapped to the mapped input pin for the new entity;
connecting the old entity and the new entity via the new output port and the new input port;
determining an output port that drives the input port of the node;
disconnecting the input port of the entity from the output port;
connecting the output port to the mapped output pin for the old entity;
connecting the input port of the node to the mapped input pin for the new entity; and
if the output port is the output port of the mapped input pin and the output port has no fanout, removing the output port from the old entity.

17. The method of claim 15, wherein the determining at least one output port of the node comprises:
for each output port of the at least one output port of the node, performing a series of steps including:
creating a mapped input pin for an old entity;
creating a mapped output pin for a new entity;
creating a new input port for the old entity, wherein the new input port is mapped to the mapped input pin for the old entity;
creating a new output port for the new entity, wherein the new output port is mapped to the mapped output pin for the new entity;
connecting the new entity and the old entity via the new input port and new output port;
determining at least one input port that is driven by the output port of the entity; and
for each input port of the at least one input port, performing a series of steps including:
disconnecting the input port from the output port of the node;
connecting the input port to the mapped input pin for the old entity; and
connecting the output port to the mapped output pin for the new entity.

18. A non-transitory machine-readable medium for use in an electronic device that depicts a schematic diagram of an integrated circuit (IC), the non-transitory machine-readable medium comprising instructions for:
graphically representing the schematic diagram as having a first plurality of circuit elements on a user interface, wherein a circuit element of the first plurality of circuit elements is a functional element of the IC, a node, a port, a pin, or an interconnecting circuit path;
receiving user input, wherein the user input comprises instructions on selecting and organizing circuit elements of the first plurality of circuit elements;
in response to the user input, grouping a plurality of selected circuit elements into an entity, wherein the entity may comprise an aggregate of circuit elements of any type and function, wherein the entity is displayed, on the schematic diagram, instead of the plurality of selected circuit elements; and
in response to the user input, ungrouping at least one selected entity on the schematic diagram into a second plurality of circuit elements.

19. The non-transitory machine-readable medium of claim 18, wherein the user input comprises at least one of:
user input coded in a scripting language and entered at a command prompt of a user interface; and
user input entered using a graphical user interface (GUI).

20. The non-transitory machine-readable medium of claim 18, wherein the ungrouping comprises regrouping a plurality of entities and a plurality of paths back into the entity.

21. The non-transitory machine-readable medium of claim 18 further comprising instructions for providing a drag-and-drop tool for transferring a circuit element from a source entity to a destination entity, wherein the user transfers at least one circuit element from the source entity to the destination entity.

22. The non-transitory machine-readable medium of claim 18, wherein the non-transitory machine-readable medium is an element of an electronic design automation tool.

23. An electronic device to generate and display a schematic diagram of an integrated circuit (IC) design, the electronic device comprising:
a memory;

a display screen, wherein the display screen displays the schematic diagram of the IC design; and a processor, wherein the processor executes instructions comprising:

generating the schematic diagram of the IC design on a graphical user interface (GUI);

receiving input from a user related to simplifying the schematic diagram; and based on the input from the user, simplifying the schematic diagram by performing:

grouping a first plurality of circuit elements on the GUI into an entity, wherein the first plurality of circuit elements can be selected and grouped into the entity independent of their type, further wherein the entity is displayed, on the schematic diagram, instead the first plurality of circuit elements; and ungrouping at least one entity on the GUI into a second plurality of circuit elements.

24. The electronic device of claim 23 further comprising input media to allow the user to select a third plurality of circuit elements and regroup the third plurality of circuit elements.

25. The electronic device of claim 23 further comprising input media to allow the user to perform a drag-and-drop operation, wherein the user drags at least one circuit element from a group having a fourth plurality of circuit elements to another group having a fifth plurality of circuit elements.

* * * * *